(12) United States Patent
Kojima

(10) Patent No.: US 10,785,147 B2
(45) Date of Patent: Sep. 22, 2020

(54) DEVICE AND METHOD FOR CONTROLLING ROUTE OF TRAFFIC FLOW

(71) Applicant: FUJITSU LIMITED, Kawasaki-shi, Kanagawa (JP)

(72) Inventor: Yuji Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 16/021,733

(22) Filed: Jun. 28, 2018

(65) Prior Publication Data

US 2019/0007306 A1    Jan. 3, 2019

(30) Foreign Application Priority Data

Jul. 3, 2017    (JP) .................................. 2017-130095

(51) Int. Cl.
*H04L 12/721* (2013.01)
*H04L 12/741* (2013.01)
*H04L 12/725* (2013.01)
*G06F 9/455* (2018.01)

(52) U.S. Cl.
CPC .......... *H04L 45/38* (2013.01); *G06F 9/45558* (2013.01); *H04L 45/306* (2013.01); *H04L 45/74* (2013.01); *G06F 2009/45595* (2013.01); *H04L 45/44* (2013.01)

(58) Field of Classification Search
CPC combination set(s) only.
See application file for complete search history.

(56) References Cited

U.S. PATENT DOCUMENTS

| 9,965,366 | B2 * | 5/2018 | Fu ........................ G06F 11/2033 |
| 2004/0133678 | A1 * | 7/2004 | Tamura ................. G06F 16/258 709/225 |
| 2015/0188949 | A1 * | 7/2015 | Mahaffey .......... H04W 12/0027 726/1 |
| 2016/0066189 | A1 * | 3/2016 | Mahaffey .............. H04M 15/58 455/405 |
| 2017/0026488 | A1 * | 1/2017 | Hao ........................ H04L 67/32 |
| 2017/0052809 | A1 | 2/2017 | Kano |
| 2017/0220451 | A1 * | 8/2017 | Mankovskii ........ G06F 11/3664 |
| 2017/0223051 | A1 * | 8/2017 | Krapf .................... H04L 9/3242 |
| 2017/0289130 | A1 * | 10/2017 | Park ...................... H04L 63/083 |

(Continued)

FOREIGN PATENT DOCUMENTS

| JP | 2004-157713 | 6/2004 |
| JP | 2017-41846 | 2/2017 |

*Primary Examiner* — Yee F Lam
(74) *Attorney, Agent, or Firm* — Staas & Halsey LLP

(57) ABSTRACT

A route control device controls a route of a traffic flow in a server device that accommodates a plurality of entities. The route control device includes: a generator, a processor and a route controller. The generator generates first control information that indicates a right to indicate a route of the traffic flow in a first range of the server device. The processor receives first route indication information that indicates a route of the traffic flow and the first control information from a first entity in the plurality of entities and decides whether the first route indication information indicates a route in the first range. The route controller controls a route of the traffic flow based on the first route indication information when the first route indication information indicates a route in the first range.

4 Claims, 19 Drawing Sheets

(56) References Cited

U.S. PATENT DOCUMENTS

2018/0212962 A1\* 7/2018 Reznik ................. H04W 12/06
2018/0212975 A1\* 7/2018 Bandi .................. H04W 12/06
2018/0302222 A1\* 10/2018 Agrawal ............... H04L 63/102
2018/0331941 A1\* 11/2018 Singh .................... H04L 45/16

\* cited by examiner

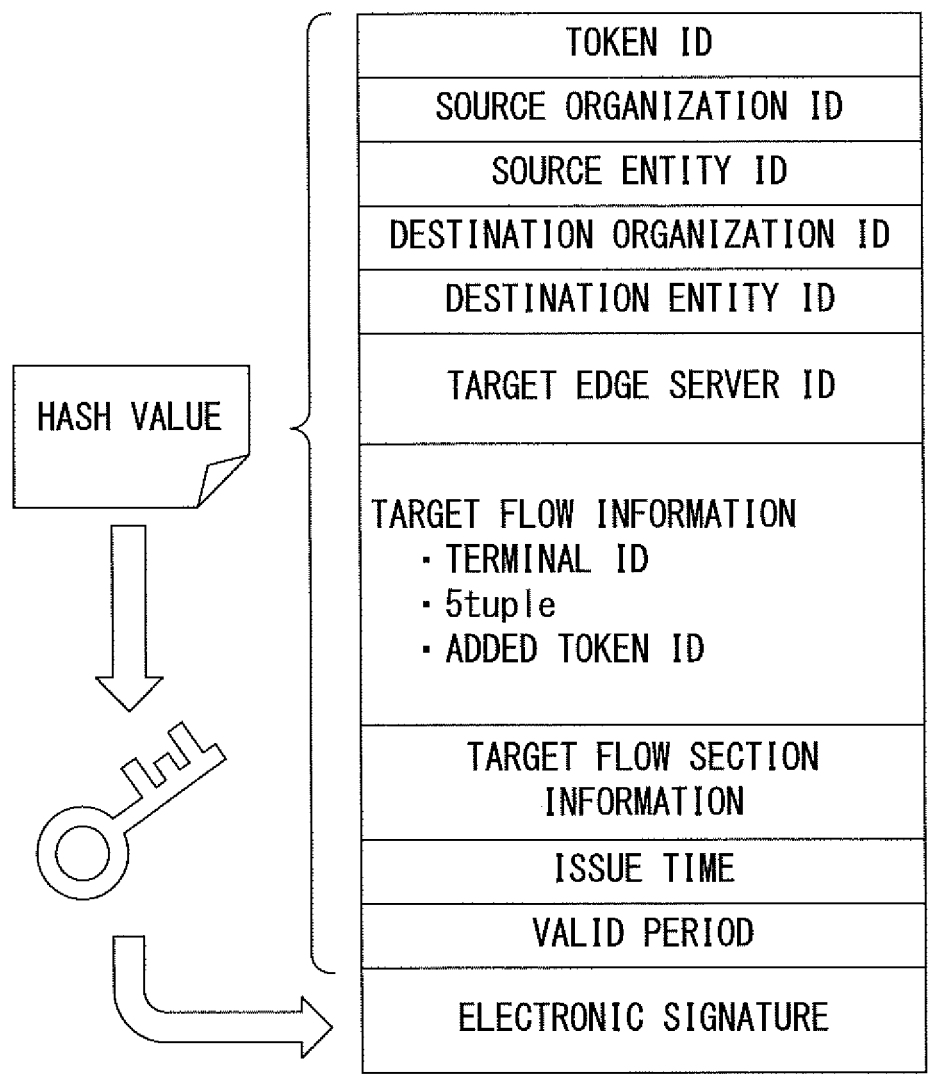
F I G. 7

| TOKEN ID | TARGET FLOW | ROUTE |
|---|---|---|
| #1 | #1 | #2 → #1 |
| #2 | #1 | #4 → #3 → #2 → #1 |
| #3 | #1 | #5 → #4 → #3 → #2 → #1 |

| TOKEN ID | TARGET FLOW | ROUTE |
|---|---|---|
| #1 | #1 | #2 → #1 |
| #2 | #1 | #4 → #3 → #2 |
| #3 | #1 | #5 → #4 |

S11 →

S16 →

| TOKEN OF TARGET FLOW | HEADER INFORMATION ON TARGET FLOW | ROUTE |
|---|---|---|
| #1 | | #5 → #4 → #3 → #2 → #1 (UL) |
| #5 | | #8 → #7 → #6 (UL) |
| ... | | |

FIG. 9

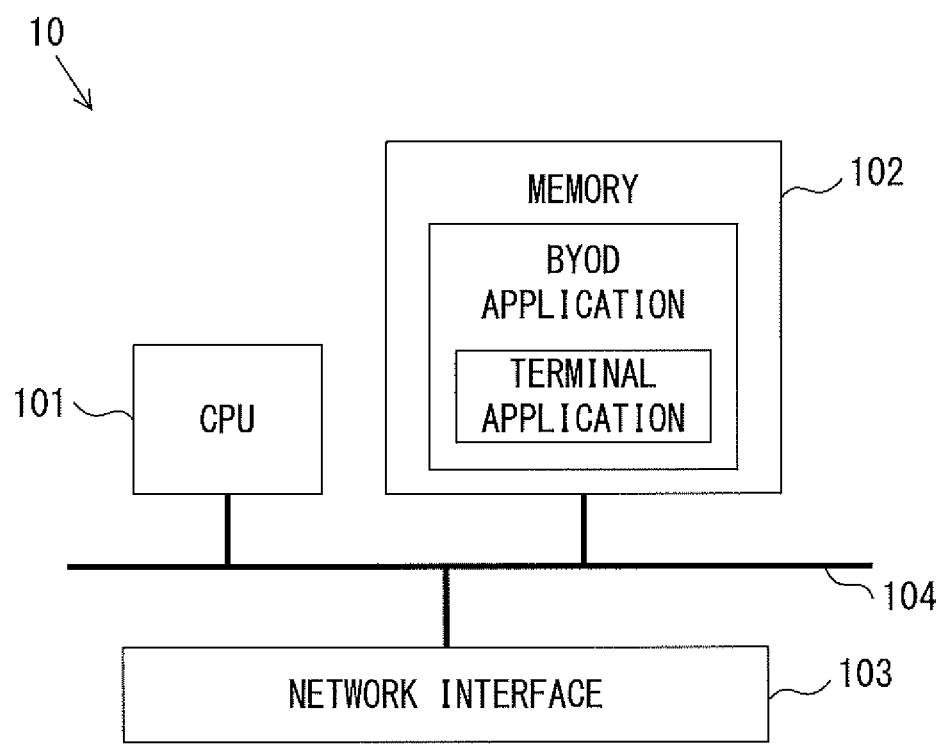
F I G. 1 5

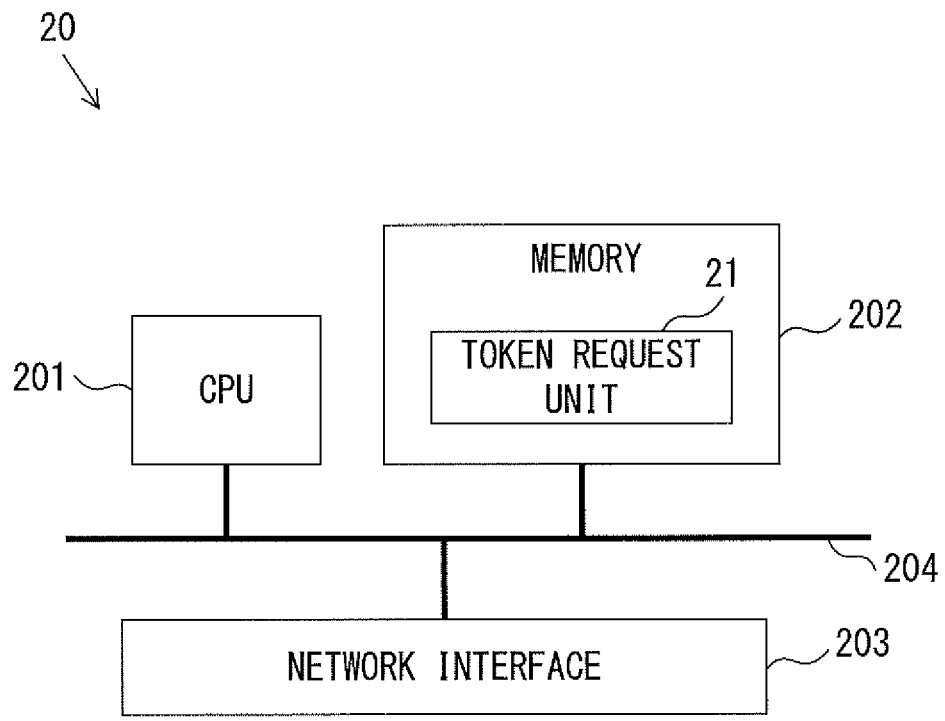
F I G. 16

DEVICE AND METHOD FOR CONTROLLING ROUTE OF TRAFFIC FLOW

CROSS-REFERENCE TO RELATED APPLICATION

This application is based upon and claims the benefit of priority of the prior Japanese Patent Application No. 2017-130095, filed on Jul. 3, 2017, the entire contents of which are incorporated herein by reference.

FIELD

The embodiments discussed herein are related to a device and a method for controlling a route of a traffic flow.

BACKGROUND

In recent years, a configuration in which an application is arranged in an edge server, not on a cloud, has been put into practical use, in order to reduce a delay in access to the application from a terminal. In this case, the edge server controls a route such that a traffic flow passes through one or more applications arranged in the edge server. Further, the edge server guides, as needed, the traffic flow to another application (such as a business application) arranged on a cloud. In a mobile network, the edge server may be arranged, for example, near a base station.

FIG. 1 illustrates an example of a network that includes an edge server. In the example illustrated in FIG. 1, a business application (B_APP) 300 of an organization A is arranged on a cloud. The "organization" corresponds to, for example, a company or a corporation. A terminal 100 that belongs to the organization A is accommodated in an edge server 200. The edge server 200 is managed and operated by an organization D that is a different organization than the organization A. The organization D that manages and operates the edge server 200 corresponds to, for example, a telecom carrier (a mobile network operator when the network is a mobile network). The terminal 100 can access the business application 300 through the edge server 200.

The edge server 200 can accommodate a plurality of applications. In the example illustrated in FIG. 1, the edge server 200 accommodates an application #1 that is managed by the organization A and applications #2 and #3 that are managed by an organization B. The edge server 200 includes a route indication processor 201 and a route controller 202. The route indication processor 201 accepts route indication information that indicates a route of a traffic flow. The route controller 202 controls a route of a traffic flow according to the route indication information accepted by the route indication processor 201.

For example, it is recommended that the access from the terminal 100 to the business application 300 satisfy the following policies.
(1) Preprocess is performed by the application #1.
(2) Security process is performed by the application #2 before the execution of the application #1.
(3) Filtering process is performed by the application #3 before the execution of the application #2.
In this case, the traffic flow headed for the business application 300 from the terminal 100 is controlled to pass through the application #3, the application #2, and the application #1 in this order.

Related technologies are disclosed in, for example, Japanese Laid-open Patent Publication No. 2004-157713 and Japanese Laid-open Patent Publication No. 2017-41846.

In the network described above, the route of a traffic flow in the edge server 200 is indicated by, for example, the terminal 100. However, the terminal 100 may be unaware of an application of an organization that is other than the organization to which the terminal 100 belongs. In the example illustrated in FIG. 1, the terminal 100 may be unaware of the applications #2 and #3 of the organization B. In this case, it is difficult for the terminal 100 to generate a traffic flow that passes through the applications #2 and #3.

This problem may be solved if the policies (2) and (3) described above are reported to the terminal 100 in advance. However, in this case, a terminal determines whether to implement security measures. That is, a user of the terminal 100 may omit the security measures. Thus, this is not a preferable operation scheme.

Further, a system administrator of the organization A may not know the configuration of an application in the organization B. For example, it is assumed that an agreement for the use of security software (the application #2 in this case) of the organization B has been concluded between the organization A and the organization B. However, the system administrator of the organization A does not know that there is a need to arrange filtering software (the application #3 in this case) on the input side of the security software. In this case, it is difficult for the system administrator of the organization A to establish the route illustrated in FIG. 1.

In addition, in the example illustrated in FIG. 1, the destination of the traffic flow is the business application 300. In other words, the application #1 is not the destination of the traffic flow. In this case, the application #1 does not have a right to indicate a route of the traffic flow.

As described above, in conventional technologies, it may be difficult to establish a route of a traffic flow in an edge server. In other words, in conventional technologies, it may be difficult to establish a traffic flow that passes through a desired application in an edge server.

SUMMARY

According to an aspect of the present invention, a route control device controls a route of a traffic flow in a server device that accommodates a plurality of entities. The route control device includes: a generator configured to generate first control information that indicates a right to indicate a route of the traffic flow in a first range of the server device; a processor configured to receive first route indication information that indicates a route of the traffic flow and the first control information from a first entity in the plurality of entities and to decide whether the first route indication information indicates a route in the first range; and a route controller configured to control a route of the traffic flow based on the first route indication information when the first route indication information indicates a route in the first range.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a format of a token;

FIGS. 8A and 8B illustrate examples of a route indication information management table;

FIG. 9 illustrates an example of a route information table;

FIG. 15 illustrates an example of a configuration of a terminal;

FIG. 16 illustrates an example of a configuration of a terminal manager;

DESCRIPTION OF EMBODIMENTS

Figure 1:
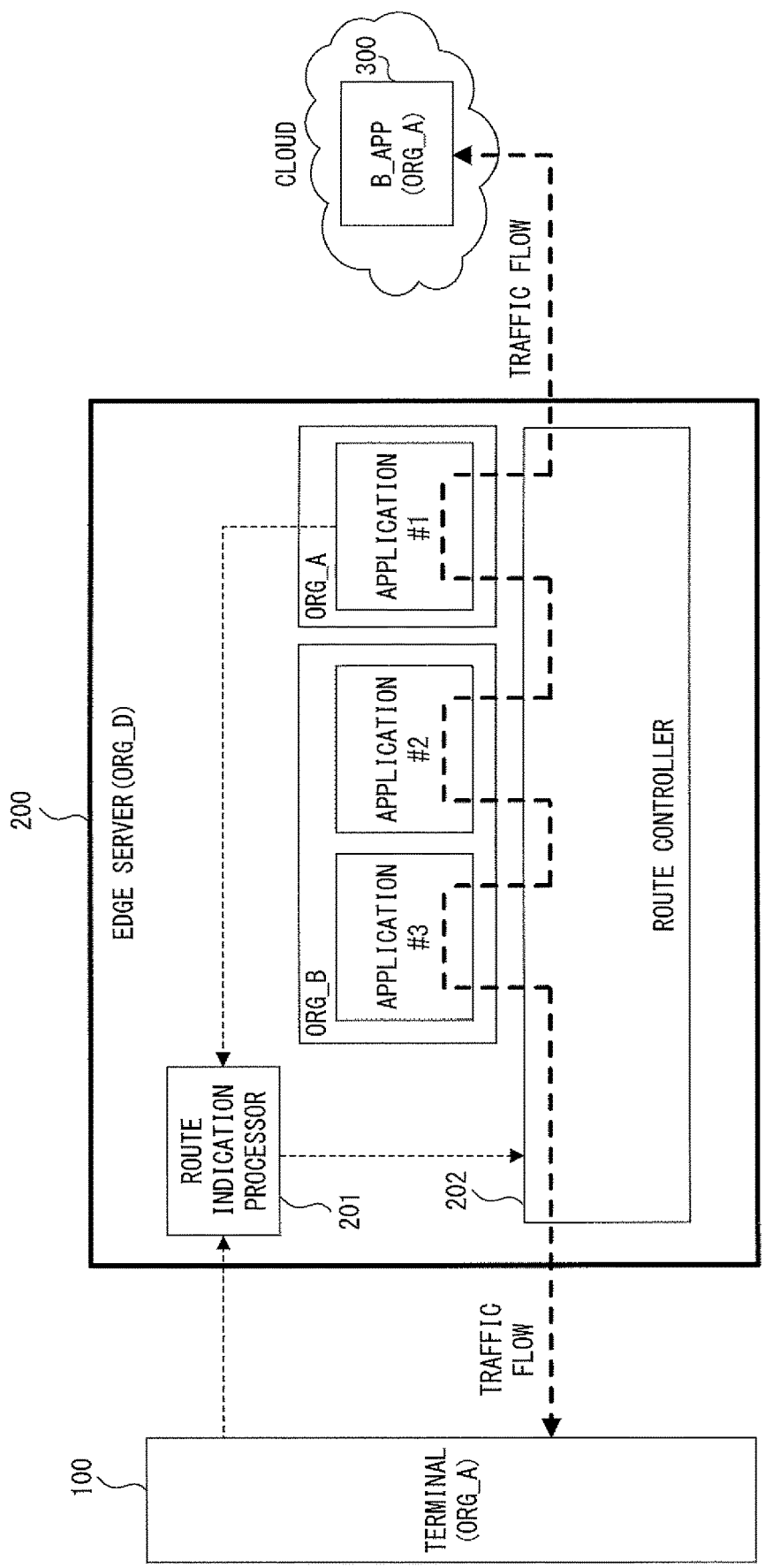
FIG. 1 illustrates an example of a network that includes an edge server.
Figure 2:
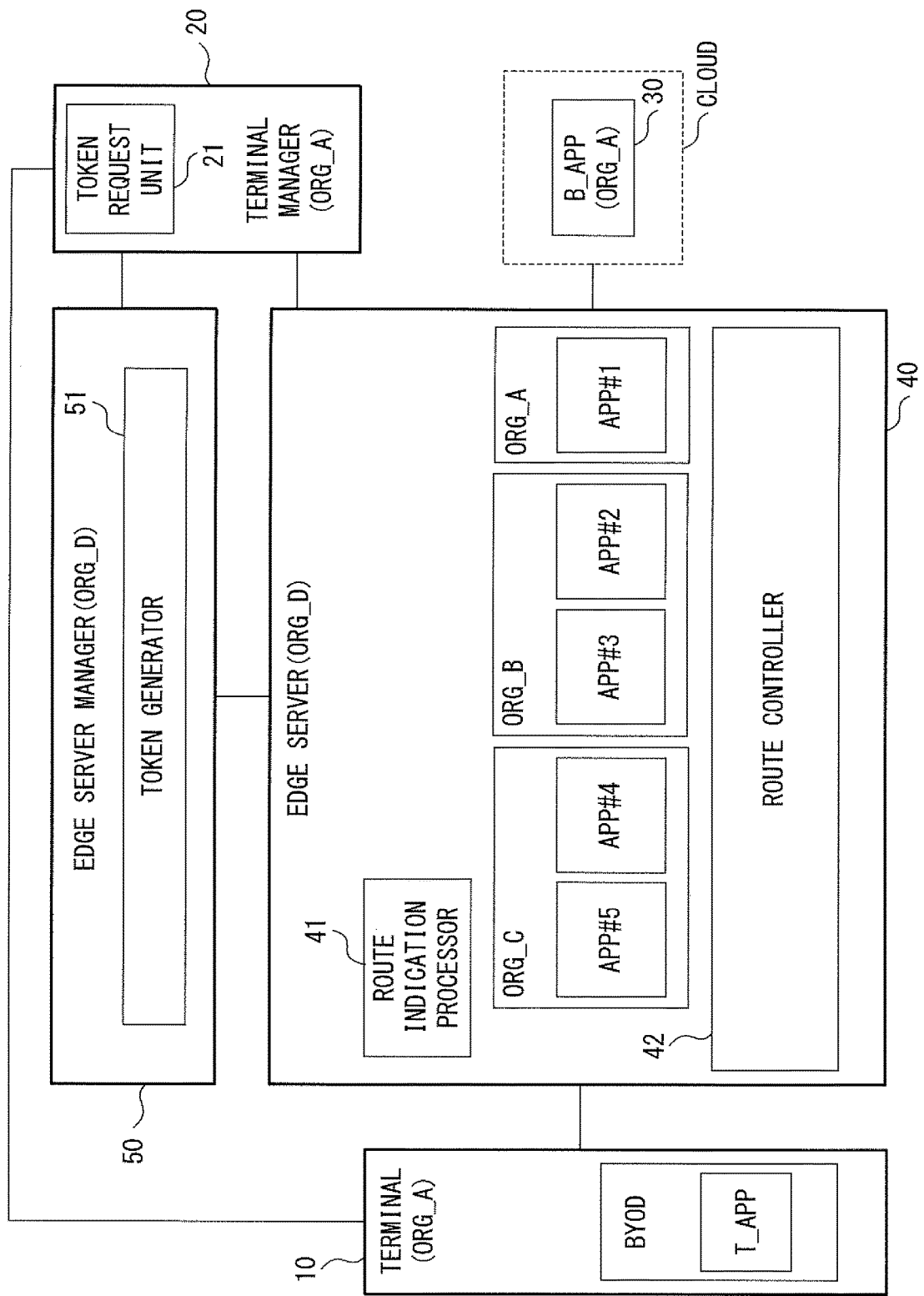
FIG. 2 illustrates an example of a network that includes an edge server according to embodiments of the present invention.

FIG. 2 illustrates an example of a network that includes an edge server according to embodiments of the present invention. In the example illustrated in FIG. 2, a business application 30 of an organization A is arranged on a cloud. The "organization" corresponds to, for example, a company or a corporation. The business application 30 is implemented in a server computer (a target server). A terminal 10 that belongs to the organization A can be connected to an edge server. In the example illustrated in FIG. 2, the terminal 10 is connected to an edge server 40. The edge server 40 is managed and operated by an organization D that is a different organization than the organization A. The organization D that manages and operates the edge server 40 corresponds to, for example, a telecom carrier (a mobile network operator when the network is a mobile network). The terminal 10 accesses the business application 30 through the edge server 40. In the following description, a link that transmits a signal from the terminal 10 to the cloud may be referred to as an "uplink". A link that transmits a signal from the cloud to the terminal 10 may be referred to as a "downlink".

A terminal manager 20 manages a terminal that belongs to the organization A. In other words, the terminal manager 20 manages a plurality of terminals including the terminal 10. For example, the terminal manager 20 knows which business application each terminal accesses. In FIG. 2, the terminal manager 20 knows that the terminal 10 uses the business application 30. Further, the terminal manager 20 includes a token request unit 21. The token request unit 21 can make a request to an edge server manager 50 for a token described later.

The edge server 40 can accommodate a plurality of applications. In the example illustrated in FIG. 2, the edge server 40 accommodates an application #1 that is managed by the organization A, applications #2 and #3 that are managed by an organization B, and applications #4 and #5 that are managed by an organization C. The application #1 performs preprocess for the business application 30. The application #2 performs security process. The security process provides, for example, a firewall function. The application #3 performs filtering process. The application #4 performs log process. The log process records a traffic flow that passes through an edge server. The application #5 performs capturing process. The capturing processing stores packets in the traffic flow that passes through the edge server.

The edge server 40 includes a route indication processor 41 and a route controller 42. The route indication processor 41 accepts route indication information that indicates a route of a traffic flow in the edge server 40. Here, the route indication processor 41 decides whether a route indicated by the route indication information is to be approved. The route controller 42 controls the route of the traffic flow according to the route indication information accepted by the route indication processor 41.

The edge server manager 50 manages the edge server 40. Thus, as in the case of the edge server 40, the edge server manager 50 is operated by the organization D. Further, the edge server manager 50 includes a token generator 51. The token generator 51 generates a token according to a request from the terminal manager 20 or the edge server 40. The edge server 40 and the edge server manager 50 may be implemented by a single computer or a plurality of computers. The edge server manager 50 may manage a plurality of edge servers 40.

It is assumed that, in a computing environment having the configuration described above, the organization A has the following policies (A1 and A2) to access the business application 30. It is assumed that an agreement for the use of the application #2 has been concluded between the organization A and the organization B. In other words, the application #2 is reliable software for the organization A.

(A1) Preprocess is performed by the application #1.

(A2) Security process is performed by the application #2 of the organization B before the execution of the application #1. Thus, in order to satisfy the policy A2, the application #1 has a function that generates route indication information indicating that a traffic flow that passes through the application #1 passes through the application #2 before the application #1.

It is assumed that the organization B has the following policies (B1 and B2) to execute the application #2. It is assumed that an agreement for the use of the application #4 has been concluded between the organization B and the organization C. In other words, the application #4 is reliable software for the organization B.

(B1) Filtering process is performed by the application #3 before the execution of the application #2.

(B2) Log process is performed by the application #4 of the organization C before the execution of the application #3. Thus, in order to satisfy the policies B1 and B2, the application #2 has a function that generates route indication information indicating that a traffic flow that passes through the application #2 passes through the applications #3 and #4 before the application #2.

It is assumed that the organization C has the following policy (C1) to execute the application #4.
(C1) Capturing process is performed by the application #5 before the execution of the application #4.
Thus, in order to satisfy the policy C1, the application #4 has a function that generates route indication information indicating that a traffic flow that passes through the application #4 passes through the application #5 before the application #4.

In the computing environment having the configuration described above, the edge server 40 controls a route of a traffic flow of a terminal accommodated in the edge server 40. In the example illustrated in FIG. 2, the edge server 40 makes an uplink traffic flow and a downlink traffic flow of the terminal 10 pass through one or more specified applications.

At this point, there is a need for the edge server 40 to identify a traffic flow between the terminal 10 and the business application 30 from among a plurality of traffic flows. Here, the traffic flow is identified by, for example, an IP address and an L4 port number. However, for example, when the business application 30 is provided as SaaS (software as a service), a plurality of terminals use the same destination IP address and the same destination L4 port number, so it is difficult to identify a traffic flow by a destination IP address and a destination L4 port number. Further, a source IP address may be dynamically assigned to the terminal 10 when the terminal 10 is connected to a network. A source L4 port number may be dynamically selected from unused port numbers when a traffic flow is generated. Thus, it is difficult to identify a traffic flow by a source IP address and a source L4 port number.

If identification information that is fixedly assigned to the terminal 10 is used, the edge server 40 may be able to identify a traffic flow of the terminal 10. However, in a BYOD (bring your own device) environment, the traffic flows of the terminal 10 includes not only a traffic flow that accesses the business application 30 but also a private traffic flow. Thus, in this case, it is difficult to identify a traffic flow that accesses the business application 30 from the terminal 10.

Thus, in a route control method according to the embodiments of the present invention, a "token" is used to identify a traffic flow. The token is generated to indicate a route in the edge server 40 for a specified traffic flow. This token is added to a packet transmitted from the terminal 10 when the terminal 10 accesses the business application 30. When the edge server 40 receives a packet to which a token is added, the edge server 40 processes the packet such that a traffic flow follows a route indicated by the token. Thus, the edge server 40 can control the route of a traffic flow between the terminal 10 and the business application 30 such that the traffic flow passes through a desired application.

Figure 3:
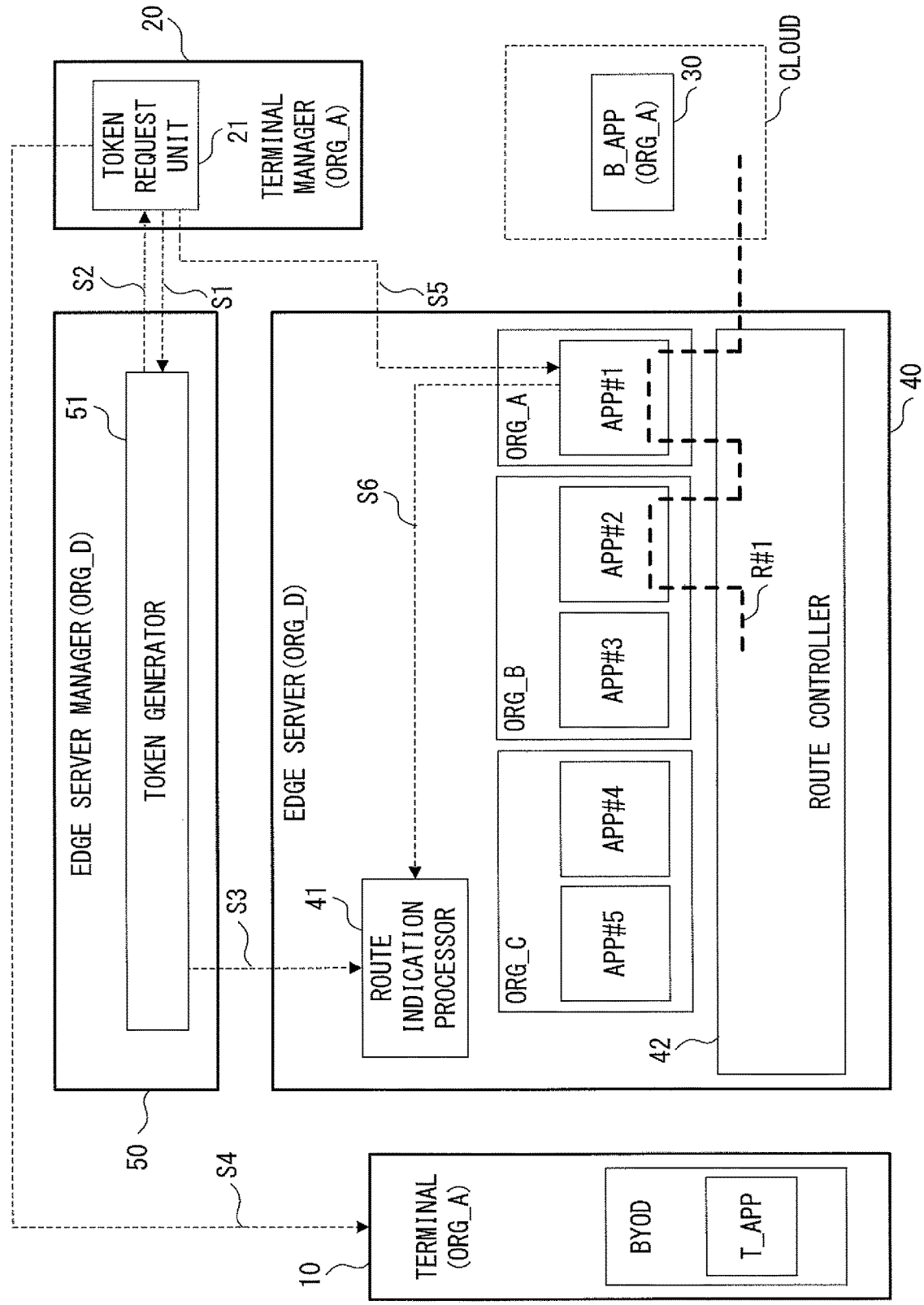
FIGS. 3 and 4 illustrate an example of a procedure for indicating a route of a traffic flow.
Figure 4:
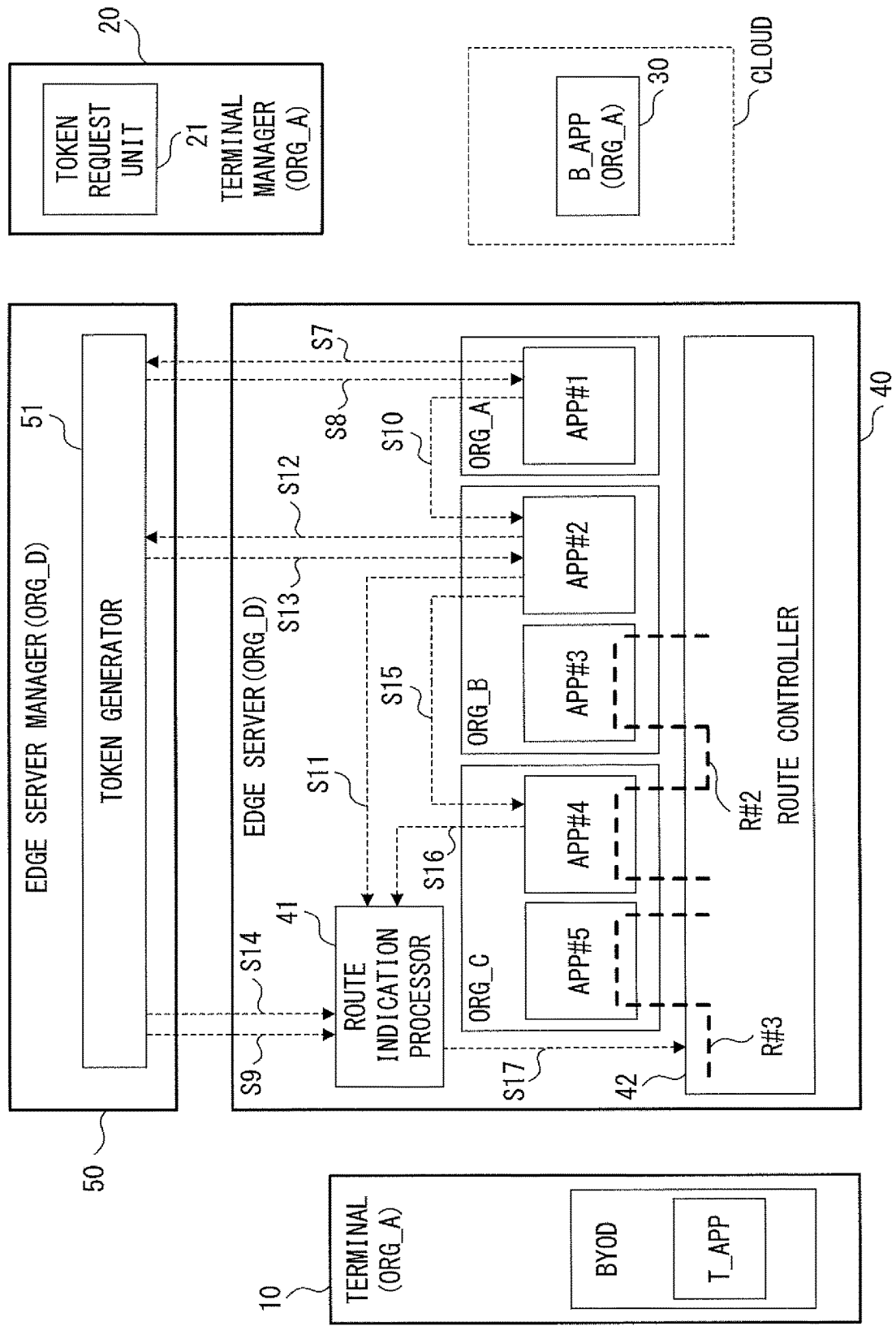
Figure 5:
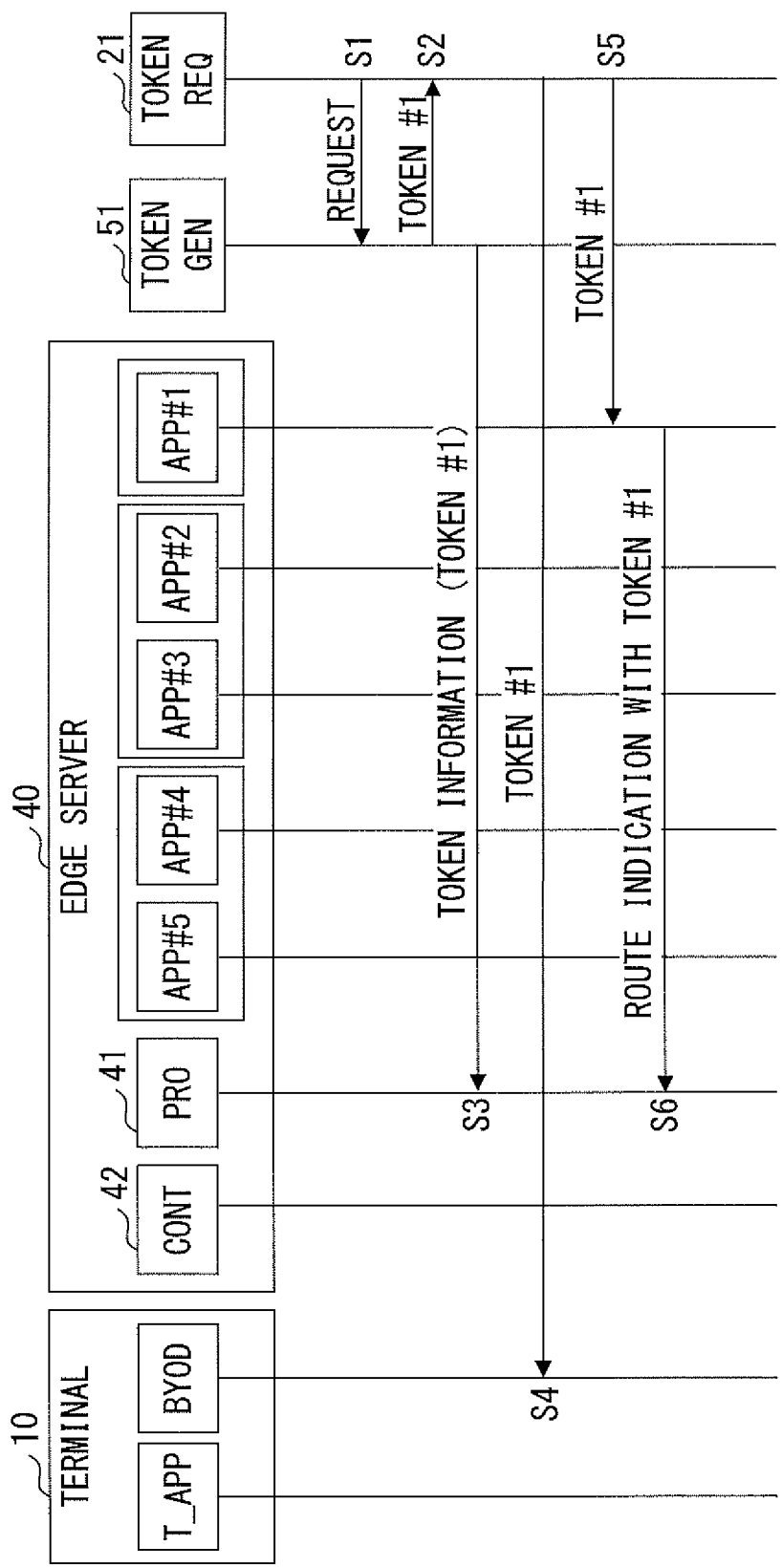
FIGS. 5 and 6 are sequence diagrams corresponding to the procedure illustrated in FIGS. 3 and 4.
Figure 6:
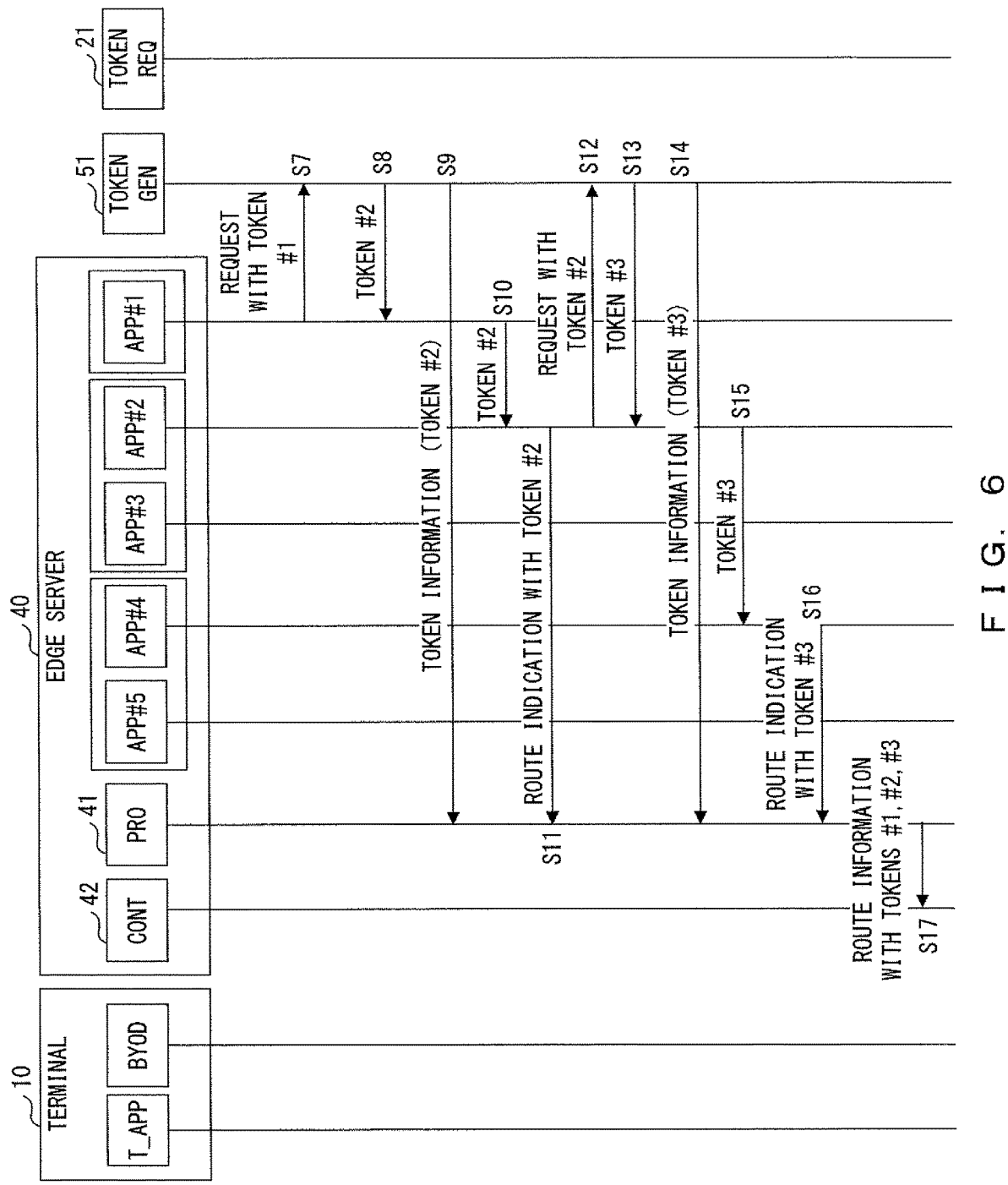

FIGS. 3 and 4 illustrate an example of a procedure for indicating a route of a traffic flow. FIGS. 5 and 6 are sequence diagrams corresponding to the procedure illustrated in FIGS. 3 and 4.

In S1, the token request unit 21 implemented in the terminal manager 20 makes a request to the token generator 51 implemented in the edge server manager 50 for a token. In this example, the token request unit 21 requests a token that represents a right to indicate a route of a traffic flow transmitted or received by a terminal application on a BYOD environment in the terminal 10. Thus, a token request that is made by the token request unit 21 includes the following information.

(1) Terminal ID: Terminal 10
(2) Identification of a flow: By a token

As described above, in a BYOD environment, it is difficult to identify a traffic flow related to the business application 30 by an element (such as an address and a port number) stored in a header of a packet before the traffic flow is established. Thus, a method that uses a token is selected as "Identification of a flow". However, when it is possible to identify a traffic flow related to the business application 30 by an element stored in header of a packet before the traffic flow is established, that element may be reported to the token generator 51 to identify the flow.

In S2, the token generator 51 generates (or issues) a token requested by the token request unit 21. As illustrated in FIG. 7, the token generated by the token generator 51 includes a token ID, a source organization ID, a source entity ID, a destination organization ID, a destination entity ID, a target edge server ID, target flow information, target flow section information, an issue time, a valid period, and an electronic signature. The "entity" is not limited to hardware or software, but represents an element to perform computer processing. In this example, each of the token request unit 21, the route indication processor 41, the route controller 42, and the token generator 51 is one entity. Further, each application is one entity.

The token ID identifies each token. The token ID is realized by, for example, a serial number.

The source organization ID identifies an organization that generates a token. In this example, the edge server manager 50 that includes the token generator 51 is managed by the organization D. Thus, the source organization ID represents the organization D. Further, the source entity ID identifies an entity that generates a token. In this example, the source entity ID represents the edge server manager 50.

The destination organization ID identifies an organization for which a token is to be generated. The destination entity ID identifies an entity that requested a token. For example, in S2, the token is requested by the terminal manager 20. Thus, the destination organization ID represents the organization A, and the destination entity ID represents the terminal manager 20.

The target edge server ID identifies an edge server in which a token is valid. When the token is valid in a plurality of edge servers, a range in which the token is valid is indicated. In this case, the plurality of edge servers may be represented, for example, using a wild card.

The target flow information indicates a traffic flow for which a right of a token is valid. In this example, the target flow information includes a terminal ID, five tuples, and a token ID. The terminal ID represents a terminal that transmits or receives a target traffic flow. The five tuples represent a source IP address, a destination IP address, a source L4 port number, a destination L4 port number, and a protocol number that are stored in an IP header. Each of the elements in the five tuples may be represented using a wild card. The token ID identifies a token.

The target flow section information indicates a section in which a route indication is approved for a target traffic flow. The issue time represents a time at which a token was generated. The valid period represents a valid period for a token. The electronic signature is generated by encoding a hash value with a private key of the edge server manager 50, the hash value being calculated using values of the fields from the "token ID" to the "valid period".

Main elements of a token generated in S2 are described below. In the following description, a token identified by "#1" may be referred to as a "token #1".

<Content of Token #1>
(1) Token ID: #1
(2) Target flow information: Token #1 (terminal 10)
(3) Target flow section: ***

Note that "Target flow information: Token #1" indicates a state in which a right of a token is valid for a traffic flow that is identified by the token #1. "***" indicates a state in which a section in which a route indication is approved is not indicated. In this case, a route indication is approved for a target traffic flow in all of the sections of the edge server 40.

In S3, the token generator 51 transmits, to the route indication processor 41, token information that indicates the token #1 generated in S2. The token information indicates values of the fields from the "token ID" to the "valid period" illustrated in FIG. 7.

In S4, the token request unit 21 transmits the token #1 generated by the token generator 51 to the terminal 10. In the terminal 10, the token #1 is received by a BYOD processor and stored in a memory (not illustrated).

In S5, according to the above described policy A1 of the organization A, the token request unit 21 transmits the token #1 to an entity that is needed to access the business application 30. In other words, the token request unit 21 transmits the token #1 generated by the token generator 51 to the application #1.

In S6, the application #1 generates route indication information according to the above described policy A2 of the organization A. In other words, route indication information for achieving "Policy A2: Security process is performed by the application #2 of the organization B before the execution of the application #1" is generated. Specifically, route indication information that indicates a route R #1 illustrated in FIG. 3 is generated. Then, the application #1 transmits the generated route indication information to the route indication processor 41. Here, the application #1 transmits the token #1 to the route indication processor 41 together with the route indication information.

The following is an example of the route indication information transmitted in S6 from the application #1 to the route indication processor 41.

<Route Indication Information>
(1) Route: App #2→App #1 (UL)

In this example, the route indication information indicates a route over an uplink. However, in general, a traffic flow is configured by an uplink flow and a downlink flow. When a route over a downlink is indicated, route indication information is "App #1→App #2".

The route indication processor 41 decides whether a route indicated by route indication information is to be approved by the token #1. Specifically, the route indication processor 41 decides whether the route is indicated in a range approved by the "target flow section" in the token #1. In this example, the token #1 approves a route indication for a target traffic flow in all of the sections of the edge server 40. Thus, the route indication processor 41 accepts the route indication information received from the application #1. As described above, a token is an example of control information that indicates a right to indicate a route of a traffic flow in a specified range of the edge server 40.

FIG. 8A illustrates an example of a route indication information management table. The route indication information management table is generated by the route indication processor 41. When the route indication processor 41 accepts new route indication information, the route indication processor 41 adds a corresponding record to the route indication information management table.

A "token ID" identifies a token received together with route indication information. A "target flow" represents a traffic flow whose route is to be indicated, and is extracted from the token received together with the route indication information. A "route" represents a route indicated by the received route indication information. Thus, the following record is generated in S6.

(1) Token ID: #1
(2) Target flow: Traffic flow identified by the token #1
(3) Route: App #2→App #1

The route indication processor 41 may compare the content of the token received from the application #1 in S6 with the token information received from the token generator 51 in S3. This permits the route indication processor 41 to confirm whether the token #1 received from the application #1 is an authorized token. In other words, the route indication processor 41 can exclude an unauthorized route indication. Further, using an electronic signature of the received token, the route indication processor 41 can confirm that the token has been falsified. Thus, when it is sufficient to perform a confirmation using an electronic signature, there is no need to transmit token information from the token generator 51 to the route indication processor 41. In this case, an amount of message transmission in the edge server 40 is reduced.

According to S1-S6, a route indication that satisfies the policies A1 and A2 of the organization A can be realized. In other words, a route that passes through the applications #2 and #1 in this order is indicated.

However, the application #2 is managed by the organization B. In addition, the application #1 does not know the policies of the organization B. Thus, the application #1 makes a request for the organization B to indicate a route. Here, there is a need for the application #1 to make a request for the organization B to indicate a route in a range that satisfies the policies of the organization A. Thus, the application #1 makes a request to the token generator 51 for a token that represents a right to indicate a route in a range that satisfies the policies of the organization A.

In S7, the application #1 makes a request to the token generator 51 for a new token. Here, the application #1 transmits the token #1 to the token generator 51 together with the token request. The token request transmitted in S7 from the application #1 to the token generator 51 includes the following information.

<Token Request>
(1) Target flow information: Token #1 (terminal 10)
(2) Target flow section: ***→App #2→App #1 (UL)

"***→App #2→App #1" indicates a right to indicate a route on the input side of the application #2.

In S8, the token generator 51 decides whether to generate the token requested by the application #1. Specifically, the token generator 51 decides whether the requested route indication range is a portion of the route indication range approved for the token #1. In this example, the requested route indication range is the "input side of the application #2", and the route indication range approved for the token #1 is "all of the sections". Thus, the token generator 51 generates a new token in response to the request from the application #1.

Main elements of a token generated in S8 are described below. In the following description, a token identified by "#2" may be referred to as a "token #2".

<Content of Token #2>
(1) Token ID: #2
(2) Target flow information: Token #1 (terminal 10)
(3) Target flow section: ***→App #2→App #1 (UL)

The token #2 indicates a right to indicate a route on the input side of the application #2 for a traffic flow identified by the token #1. The token generator 51 transmits the generated token #2 to the application #1.

In S9, the token generator 51 transmits token information indicating the token #2 generated in S8 to the route indication processor 41.

In S10, the application #1 transmits the token #2 to the application #2. In other words, the application #1 gives, to the application #2, a right to indicate a route in a range defined by the token #2. Specifically, the right to indicate a route on the input side of the application #2 is given to the application #2 by the application #1.

In S11, the application #2 generates route indication information according to the above described policies B1 and B2 of the organization B. In other words, route indication information for achieving "Policy B1: Filtering process is performed by the application #3 before the execution of the application #2" and "Policy B2: Log process is performed by the application #4 of the organization C before the execution of the application #3" is generated. Specifically, route indication information that indicates a route R #2 illustrated in FIG. 4 is generated. Then, the application #2 transmits the generated route indication information to the route indication processor 41. Here, the application #2 transmits the token #2 to the route indication processor 41 together with the route indication information.

The following is an example of the route indication information transmitted in S11 from the application #2 to the route indication processor 41.
<Route Indication Information>
(1) Route: App #4→App #3→App #2→App #1 (UL)

The route indication processor 41 decides whether to approve the route indication information received from the application #2. Specifically, the route indication processor 41 decides whether the route is indicated in a range approved by the "target flow section" of the token #2. In this example, the token #2 approves a route indication for a target traffic flow on the input side of the application #2. Thus, the route indication processor 41 accepts the route indication information received from the application #2.

When the route indication processor 41 accepts new route indication information, the route indication processor 41 adds a corresponding record to the route indication information management table. The following record is generated in S11, as illustrated in FIG. 8A.
(1) Token ID: #2
(2) Target flow: Traffic flow identified by token #1
(4) Route: App #4→App #3→App #2→App #1

According to S7-S11, a route indication satisfies the policies B1 and B2 of the organization B can be realized. In other words, a route that passes through the applications #4 and #3 in this order before the execution of the application #2 is indicated.

However, the application #4 is managed by the organization C. In addition, the application #2 does not know the policy of the organization C. Thus, the application #2 makes a request for the organization C to indicate a route. Here, there is a need for the application #2 to make a request for the organization C to indicate a route in a range that satisfies the policies of the organization B. Thus, the application #2 makes a request to the token generator 51 for a token that represents a right to indicate a route in a range that satisfies the policies of the organization B.

In S12, the application #2 makes a request to the token generator 51 for a new token. Here, the application #2 transmits the token #2 to the token generator 51 together with the token request. The token request transmitted in S12 from the application #2 to the token generator 51 includes the following information.
<Token Request>
(1) Target flow information: Token #1 (terminal 10)
(2) Target flow section: ***→App #4→App #3→App #2→App #1 (UL)

"***→App #4→App #3→App #2→App #1" indicates a right to indicate a route on the input side of the application #4.

In S13, the token generator 51 decides whether to generate the token requested by the application #2. Specifically, the token generator 51 decides whether the requested route indication range is a portion of the route indication range approved for the token #2. In this example, the requested route indication range is the "input side of the application #4", and the route indication range approved for the token #2 is the "input side of the application #2". Thus, the token generator 51 generates a new token in response to the request from the application #2.

Main elements of a token generated in S13 are described below. In the following description, a token identified by "#3" may be referred to as a "token #3".
<Content of Token #3>
(1) Token ID: #3
(2) Target flow information: Token #1 (terminal 10)
(3) Target flow section: ***→App #4→App #3→App #2→App #1 (UL)

The token #3 indicates a right to indicate a route on the input side of the application #4 for a traffic flow identified by the token #1. The token generator 51 transmits the generated token #3 to the application #2.

In S14, the token generator 51 transmits token information indicating the token #3 generated in S13 to the route indication processor 41.

In S15, the application #2 transmits the token #3 to the application #4. In other words, the application #2 gives, to the application #4, a right to indicate a route in a range defined by the token #3. Specifically, the right to indicate a route on the input side of the application #4 is given to the application #4 by the application #2.

In S16, the application #4 generates route indication information according to the above described policy C1 of the organization C. In other words, route indication information for achieving "Policy C1: Capturing process is performed by the application #5 before the execution of the application #4" is generated. Then, the application #4 transmits the generated route indication information to the route indication processor 41. Here, the application #4 transmits the token #3 to the route indication processor 41 together with the route indication information.

The following is an example of the route indication information transmitted in S16 from the application #4 to the route indication processor 41.
<Route Indication Information>
(1) Route: App #5→App #4→App #3→App #2→App #1 (UL)

The route indication processor 41 decides whether to approve the route indication information received from the application #4. Specifically, the route indication processor 41 decides whether the route is indicated in a range approved by the "target flow section" of the token #3. In this example, the token #3 approves a route indication for a target traffic flow on the input side of the application #4. Thus, the route indication processor 41 accepts the route indication information received from the application #4.

When the route indication processor 41 accepts new route indication information, the route indication processor 41 adds a corresponding record to the route indication information management table. The following record is generated in S16, as illustrated in FIG. 8A.
(1) Token ID: #3
(2) Target flow: Traffic flow identified by token #1
(3) Route: App #5→App #4→App #3→App #2→App #1

According to S12-S16, a route indication that satisfies the policy C1 of the organization C can be realized. In other words, a route that passes through the application #5 before the execution of the application #4 is indicated.

In S17, the route indication processor 41 determines a route of a traffic flow according to the received route indication information. In this example, the route indication processor 41 accepts the route indication information in S6, S11, and S16. Further, information needed to indicate a route is recorded in the route indication information management table illustrated in FIG. 8A. Thus, according to the route identification information management table, the route indication processor 41 determines a route of a traffic flow identified by the token #1.

In this example, the route "App #5→App #4→App #3→App #2→App #1" accepted in S16 includes the route "App #2→App #1" accepted in S6 and the route "App #4→App #3→App #2→App #1" accepted in S11. In this case, the route indication processor 41 reports the route information indicating the route accepted in S16 to the route controller 42. Here, the route indication processor 41 transmits a token that identifies a target traffic flow to the route controller 42 together with the route information. In other words, the route information indicating the route accepted in S16 and the token #1 are given to the route controller 42 by the route indication processor 41. The route indication processor 41 may report, to the route controller 42, all of the tokens (that is, the tokens #1-#3) related to the route indication.

The route controller 42 stores the route information given by the route indication processor 41 in a route information table. As illustrated in FIG. 9, the route information table stores therein a "route" in association with a token that identifies a target traffic flow. In this example, "App #5→App #4→App #3→App #2→App #1" is registered for the token #1. Further, "App #8→App #7→App #6" is registered for the token #5. As described above, applications stored in the edge server 40 are grouped by being associated with a token.

The route controller 42 establishes a route of a target traffic flow according to route information given by the route indication processor 41. In this example, the following route is established in an uplink headed for the cloud from the terminal 10 with respect to a traffic flow identified by the token #1.
(1) Guide a traffic flow transmitted from the terminal 10 to the application #5
(2) Guide the traffic flow processed by the application #5 to the application #4
(3) Guide the traffic flow processed by the application #4 to the application #3
(4) Guide the traffic flow processed by the application #3 to the application #2
(5) Guide the traffic flow processed by the application #2 to the application #1
(6) Guide the traffic flow processed by the application #1 to the business application 30

As described above, the edge server 40 routes a packet to which a token has been added, such that the packet passes through one or more applications that are grouped for the token. In the example illustrated in FIG. 9, a packet to which the token #1 has been added is controlled to pass through the applications #5, #4, #3, #2, and #1 in this order. A packet to which the token #5 has been added is controlled to pass through the applications #8, #7, and #6 in this order.

A route reverse to the route for an uplink is established for a downlink headed for the terminal 10 from the business application 30. In other words, the route controller 42 establishes a route in a downlink such that a traffic flow identified by the token #1 passes through the applications #1, #2, #3, #4, and #5 in this order.

Figure 10:
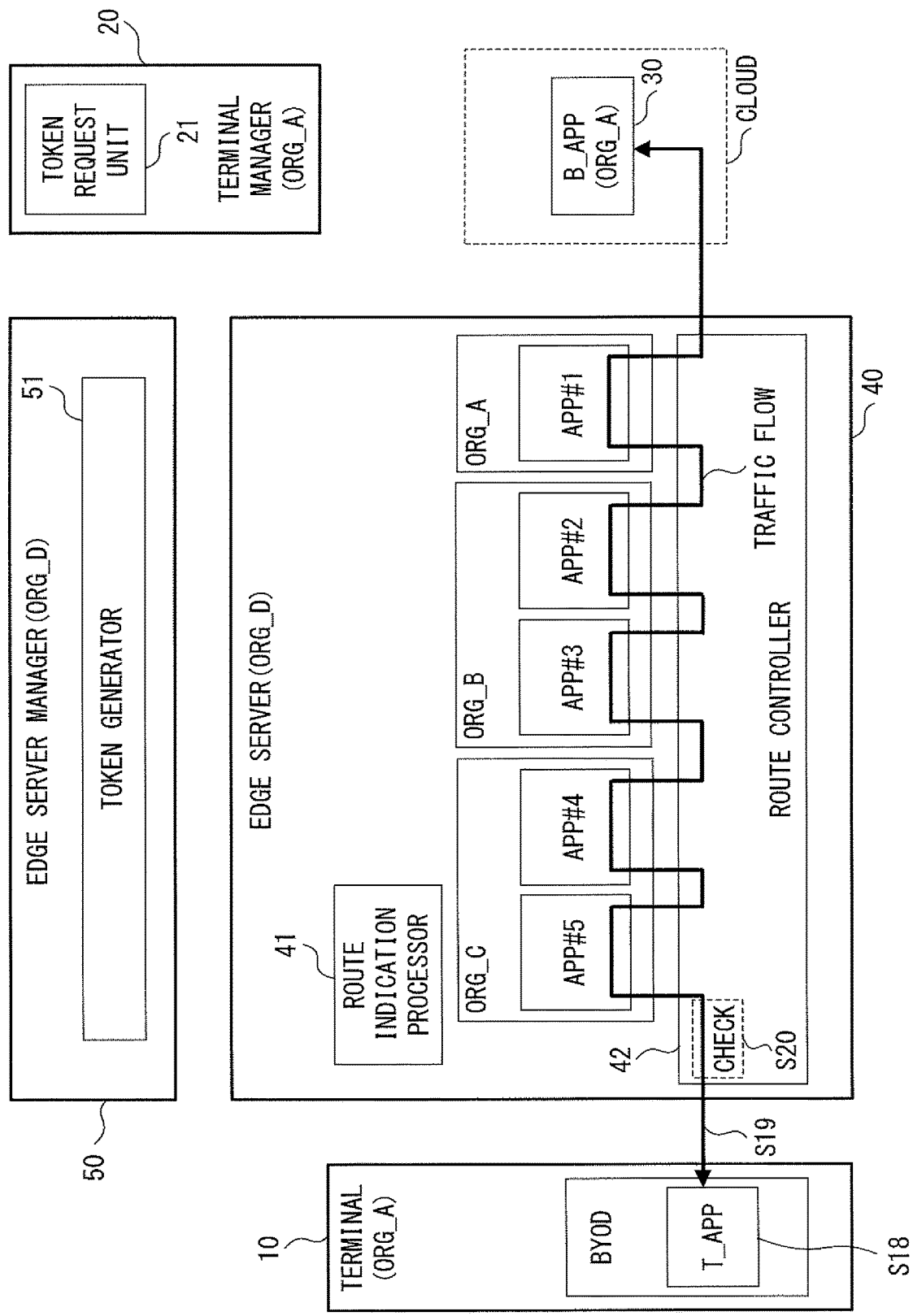
FIG. 10 illustrates an example of a method for processing a traffic flow according to a token.
Figure 11:
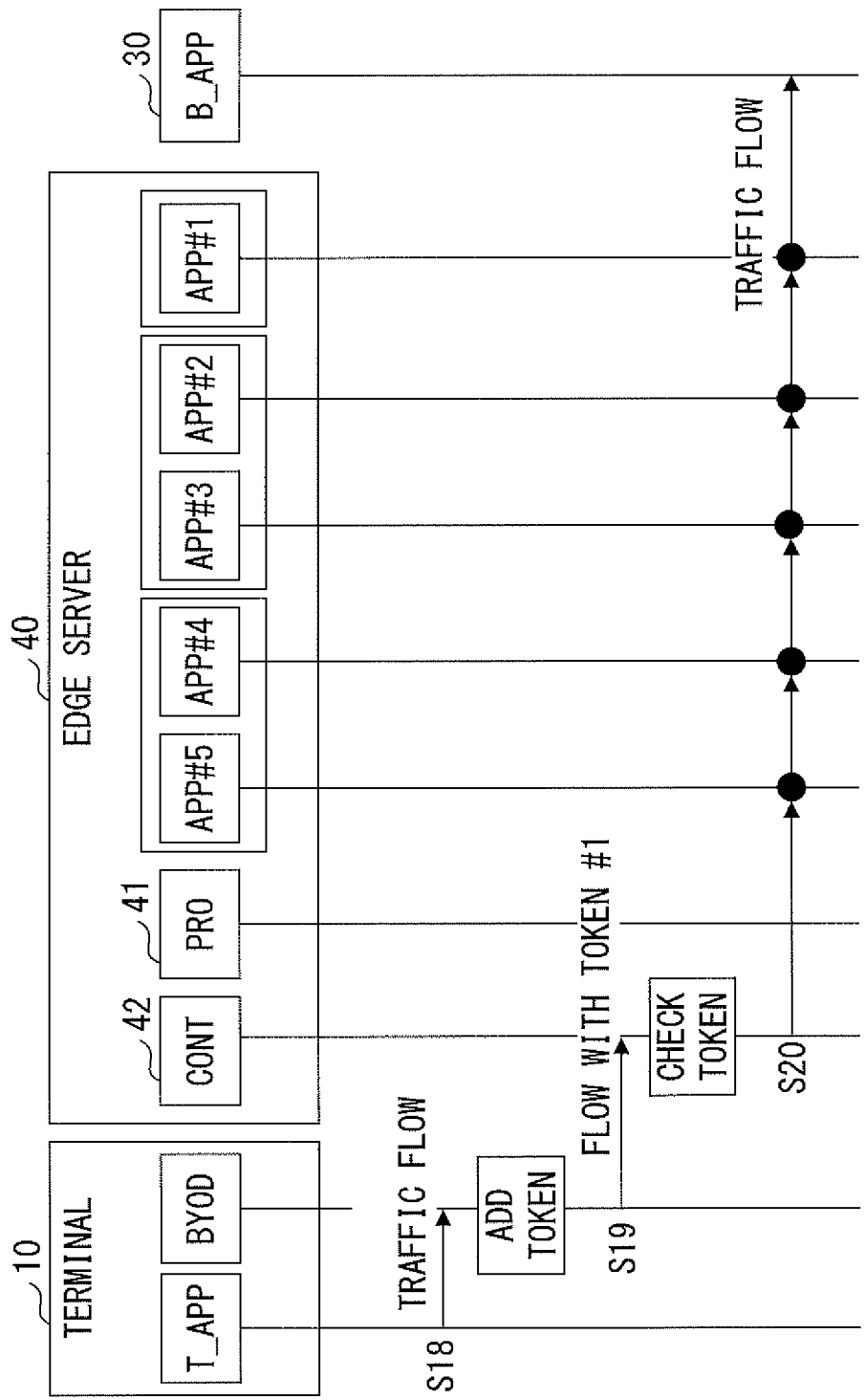
FIG. 11 is a sequence diagram that corresponds to the method illustrated in FIG. 10.

FIG. 10 illustrates an example of a method for processing a traffic flow according to a token. FIG. 11 is a sequence diagram that corresponds to the method illustrated in FIG. 10. A traffic flow in an uplink headed for the business application 30 from the terminal 10 is described below.

In S18, the terminal 10 generates a traffic flow that accesses the business application 30 that is arranged on the cloud. This traffic flow is generated by, for example, a terminal application (T_APP) implemented in the terminal 10. The destination address of each packet transmitted through the traffic flow represents the business application 30.

In S19, the terminal 10 adds a corresponding token to the traffic flow headed for the business application 30. Specifically, the terminal 10 adds the token #1 received from the terminal manager 20 in S4 to the traffic flow headed for the business application 30. Here, the token #1 is written into a specified area in a header of each packet transmitted through this traffic flow. A token is added to a traffic flow by, for example, a BYOD application.

In S20, the route controller 42 in the edge server 40 checks the token added to the traffic flow. When the token #1 is added to the traffic flow transmitted from the terminal 10, the route controller 42 processes the traffic flow according to the route established in S17. In other words, the route controller 42 guides the traffic flow to the applications #5, #4, #3, #2, and #1 in this order. Specifically, capturing process, log process, filtering process, and security process are performed on this traffic flow in this order before preprocess is performed by the application #1. After the preprocess is performed by the application #1, the edge server 40 transmits this traffic flow to the business application 30.

Figure 12:
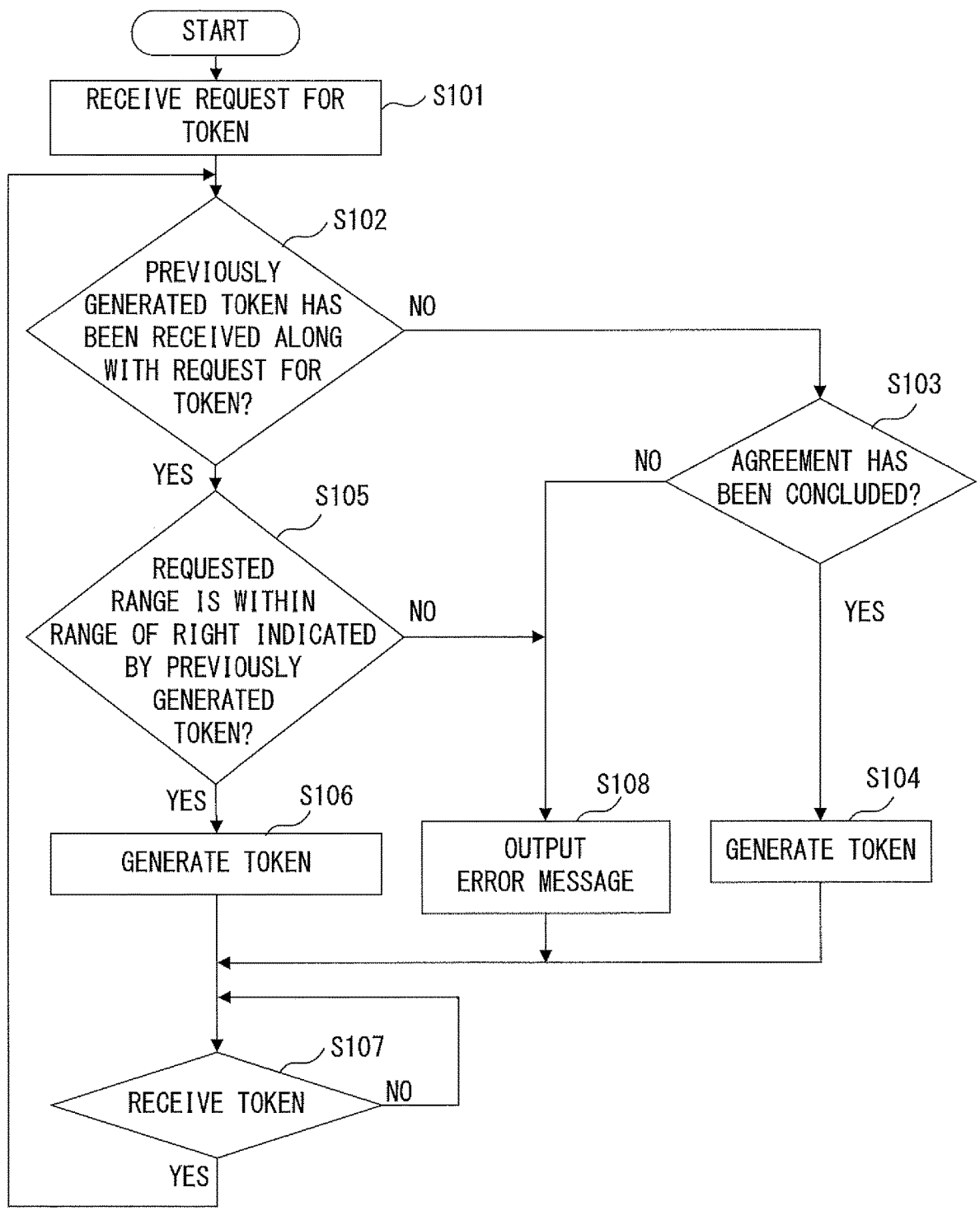
FIG. 12 is a flowchart that illustrates an example of a process performed by a token generator.

FIG. 12 is a flowchart that illustrates an example of a process performed by the token generator 51. The token generator 51 is always on standby for a token request.

In S101, the token generator 51 receives a token request. In S102, the token generator 51 decides whether a previously generated token has been received along with the token request.

When the previously generated token has not been received, the token generator 51 decides, In S103, whether an agreement for the content of the token request has been already concluded. When the agreement for the content of the token request has been already concluded, the token generator 51 generates a requested token in S104. Here, the token generator 51 may report token information indicating the content of the generated token to the route indication processor 41. After that, the token generator 51 is on standby for a next token request in S107. When the content of the token request has not been concluded, the token generator 51 outputs an error message in S108.

When the previously generated token has been received along with the token request (S102: Yes), the token generator 51 decides, in S105, whether to approve the received token request. Specifically, the token generator 51 decides whether the range of a right of the newly requested token is in the range of a right of the previously generated token.

When a new token has been requested within the range of the right of the previously generated token, the token generator 51 generates the requested token in S106. Here, the token generator 51 may report, to the route indication processor 41, token information indicating the content of the token to be newly generated. After that, the token generator 51 is on standby for a next token request in S107. When the range of the newly requested right is beyond the range of the right of the previously generated token, the token generator 51 outputs an error message in S108.

For example, it is assumed that an agreement that the organization A has a right to indicate a route of a traffic flow between the terminal 10 and the business application 30 has been concluded between the organization A and the organization D. In this case, in the example illustrated in FIG. 3, when the token generator 51 receives a token request from the terminal manager 20, the token generator 51 generates a token in S104. In the example illustrated in FIG. 4, the range of a right requested by a token request received from the application #1 is in the range of a right of the token #1. Thus, when the token generator 51 receives a token request from the application #1, the token generator 51 generates a token in S106.

Figure 13:
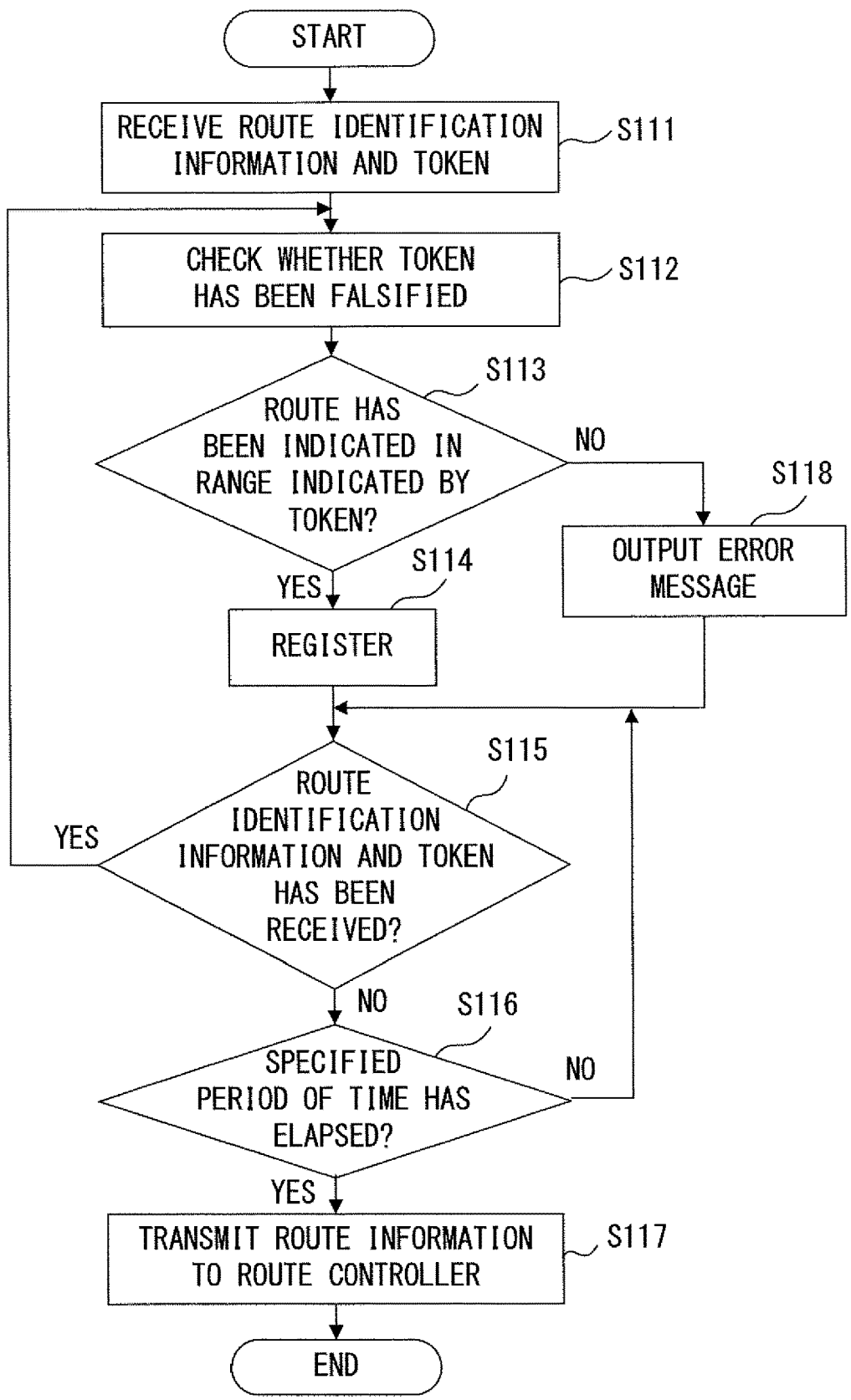
FIG. 13 is a flowchart that illustrates an example of a process performed by a route indication processor.

FIG. 13 is a flowchart that illustrates an example of a process performed by the route indication processor 41. For example, the route indication processor 41 starts performing the process when the route indication processor 41 receives token information from the token generator 51. Alternatively, the route indication processor 41 may start performing the process when the route indication processor 41 receives route indication information.

In S111, the route indication processor 41 receives route indication information and a token. In S112, the route indication processor 41 checks whether the received token has been falsified. Here, the route indication processor 41 checks whether there is a falsification using an electronic signature as illustrated in FIG. 7 or token information received from the token generator 51.

In S113, the route indication processor 41 decides whether a route has been indicated in a range of a right that is indicated by the received token (that is, in a target flow section). When the route has been indicated within the target flow section indicated by the received token, the route indication processor 41 registers, in S114, a route indicated by the route indication information in the route indication information management table. When the route has been indicated beyond the target flow section indicated by the received token, the route indication processor 41 outputs an error message in S118.

In S115 and S116, the route indication processor 41 is on standby for new route indication information. When new route indication information has been received, the process of the route indication processor 41 returns to S112. When a specified waiting time period has elapsed without new route indication information being received, the route indication processor 41 determines a route in the edge server 40 according to the route indication information management table. For example, a route that covers all of the other routes is selected when a plurality of routes for the target token are registered in the route indication information management table. Then, in S117, the route indication processor 41 reports route information indicating a determined route to the route controller 42.

Figures 14A, 14B:
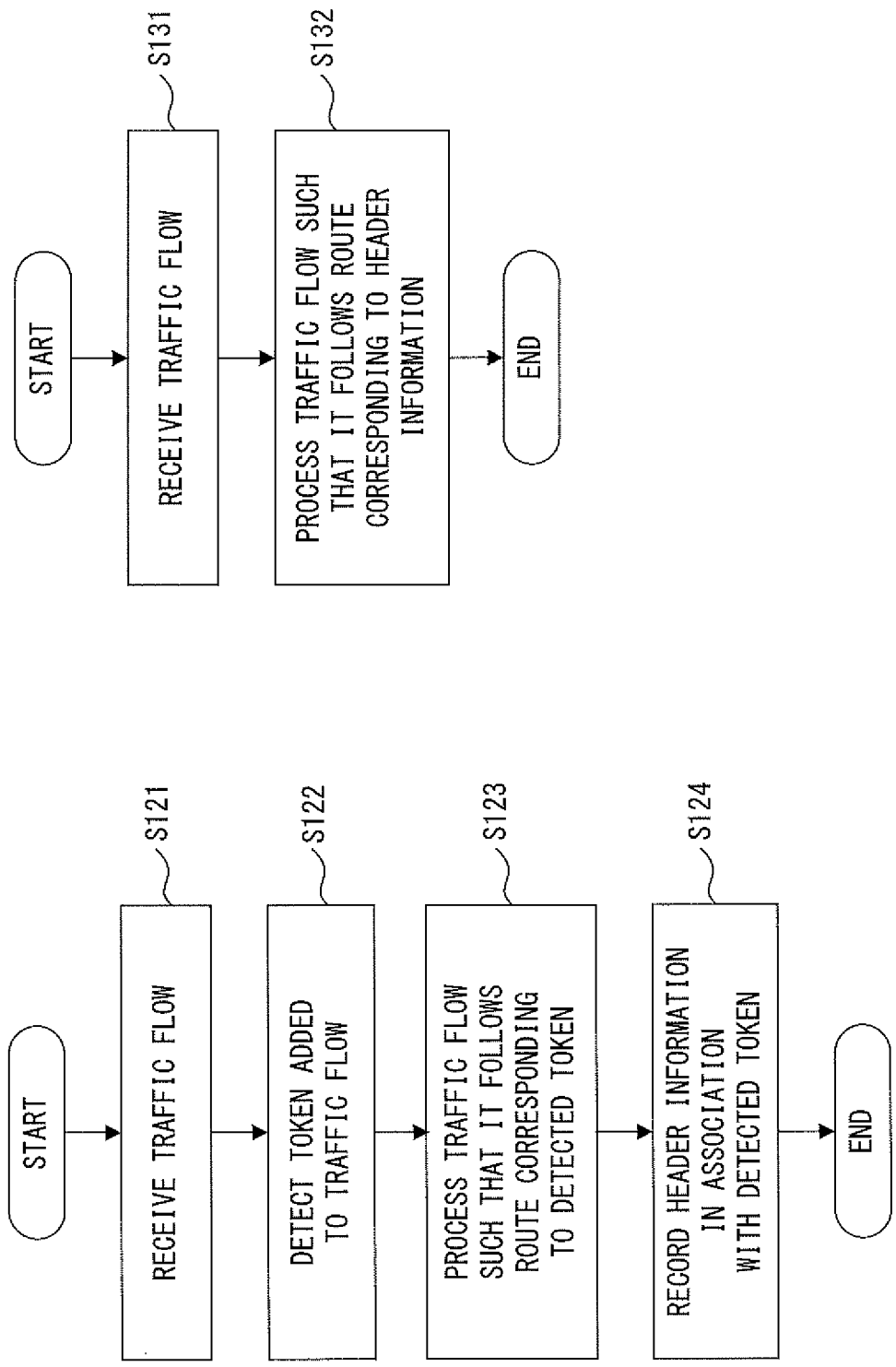
FIGS. 14A and 14B are flowcharts that illustrate examples of processes performed by a route controller.

FIG. 14A is a flowchart that illustrates an example of a process performed by the route controller 42 when a traffic flow is started. Here, it is assumed that the terminal 10 starts accessing the business application 30.

In S121, the route controller 42 receives a traffic flow transmitted from the terminal 10. In S122, the route controller 42 detects a token added to the traffic flow. In this example, it is assumed that the "token #1" is inserted into a header of each packet.

In S123, the route controller 42 processes the target traffic flow such that the target traffic flow follows a route corresponding to the token detected from the target traffic flow. For example, it is assumed that the route information table illustrated in FIG. 9 is generated according to the procedures illustrated in FIGS. 3 and 4. In this case, the route "App #5→App #4→App #3→App #2→App #1" is registered for the token #1. Thus, the route controller 42 guides the target traffic flow to the applications #5, #4, #3, #2, and #1 in this order.

In S124, header information on a packet in the target traffic flow is obtained and recorded in association with the detected token in the route information table. The header information includes at least one of a source IP address, a source port number, a destination IP address, and a destination port number.

FIG. 14B is a flowchart that illustrates an example of a process performed by the route controller 42 after the traffic flow is established. It is assumed that header information is recorded in association with a token of a target traffic flow in the route information table, according to the procedure illustrated in FIG. 14A. In S131, the route controller 42 receives a traffic flow. Here, the route controller 42 obtains header information from a packet in the traffic flow. In S132, the route controller 42 refers to the route information table, and processes the target traffic flow such that the target traffic flow follows a route corresponding to the header information obtained from the target traffic flow. The route controller 42 may control the traffic flow according to the procedure illustrated in FIG. 14B without performing the process illustrated in FIG. 14A.

FIG. 15 illustrates an example of a configuration of the terminal 10. The terminal 10 includes a CPU 101, a memory 102, and a network interface 103. The CPU 101, the memory 102, and the network interface 103 are connected to a bus 104.

The network interface 103 is implemented by, for example, an LTE interface or a wireless LAN interface. Further, the network interface 103 can communicate with the terminal manager 20 and the edge server 40 via a relay device such as a router. The memory 102 can store therein a program. In this example, a BYOD application program and a terminal application program are stored in the memory 102. The BYOD application program provides an environment in which a terminal application can operate. The CPU 101 executes a program stored in the memory 102. The process of adding a token to a traffic flow is performed by, for example, the CPU 101 executing the BYOD application program.

FIG. 16 illustrates an example of a configuration of the terminal manager 20. The terminal manager 20 includes a CPU 201, a memory 202, and a network interface 203. The CPU 201, the memory 202, and the network interface 203 are connected to a bus 204.

The network interface 203 can communicate with the terminal 10, the edge server 40, and the edge server manager 50 via a relay device such as a router. The memory 202 can store therein a program. In this example, a program that describes the process performed by the token request unit 21 is stored in the memory 202. The CPU 201 executes a program stored in the memory 202. The function of the token request unit 21 is provided by the CPU 201 executing the program stored in the memory 202.

Figure 17:
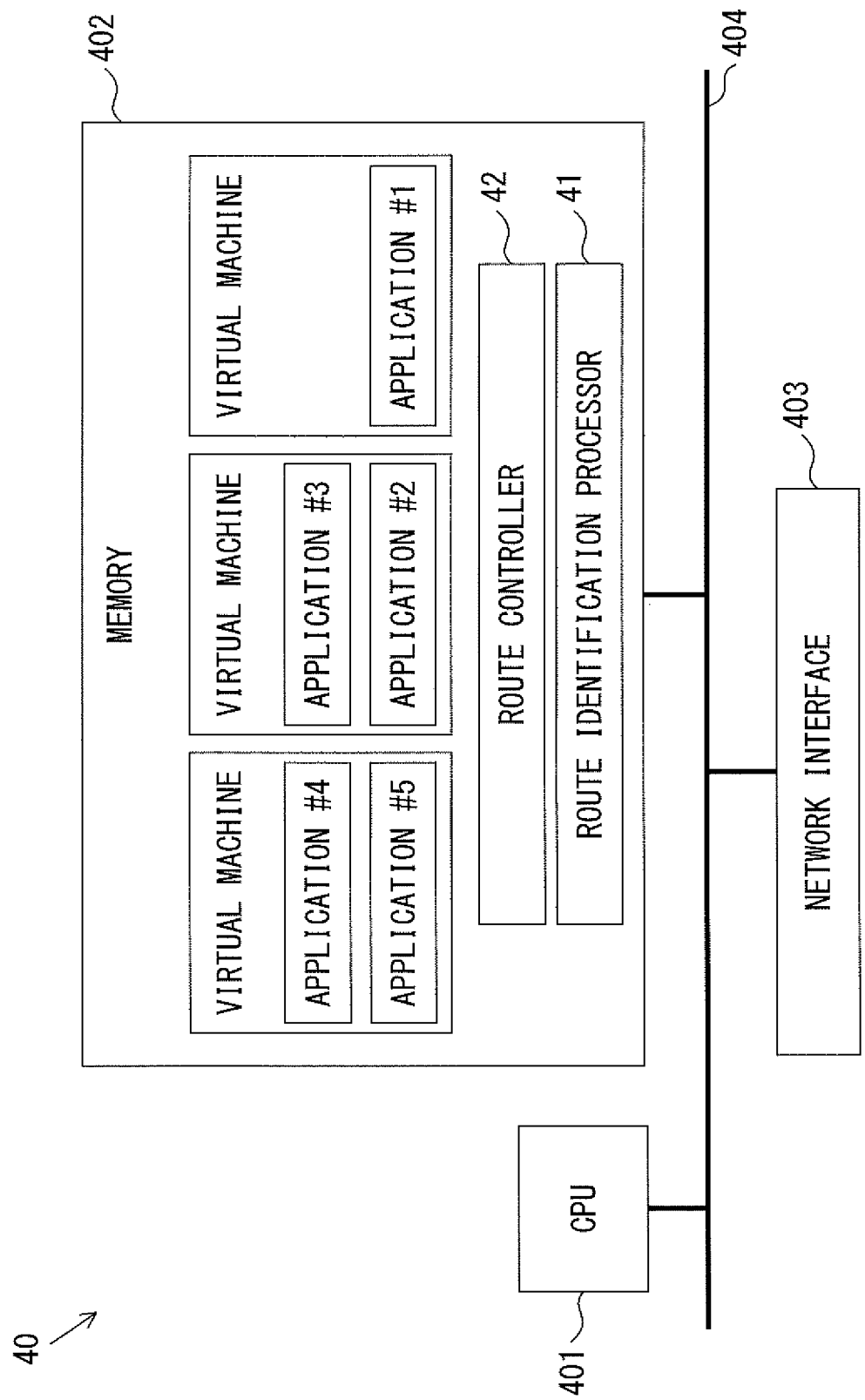
FIG. 17 illustrates an example of a configuration of an edge server.

FIG. 17 illustrates an example of a configuration of the edge server 40. The edge server 40 includes a CPU 401, a memory 402, and a network interface 403. The CPU 401, the memory 402, and the network interface 403 are connected to a bus 404. The edge server 40 may include a plurality of network interfaces 403.

The network interface 403 is implemented by, for example, Ethernet (registered trademark) or a wireless LAN interface. The network interface 403 can communicate with the terminal 10, the terminal manager 20, the edge server manager 50, and a communication device (such as a computer in which the business application 30 is implemented) on a cloud via a relay device such as a router or a base station.

The memory 402 can store therein a program. In this example, a program that describes the process performed by the route indication processor 41 and a program that describes the process performed by the route controller 42 are stored in the memory 402. A virtual machine can be configured using the memory 402. Each virtual machine provides an environment in which one application or a plurality of applications can operate. The CPU 401 executes a program stored in the memory 402. The functions of the route indication processor 41 and the route controller 42 are provided by the CPU 401 executing programs stored in the memory 402. For example, the CPU 401 provides the function of the route indication processor 41 by executing the program that describes the process of the flowchart illustrated in FIG. 13.

Figure 18:
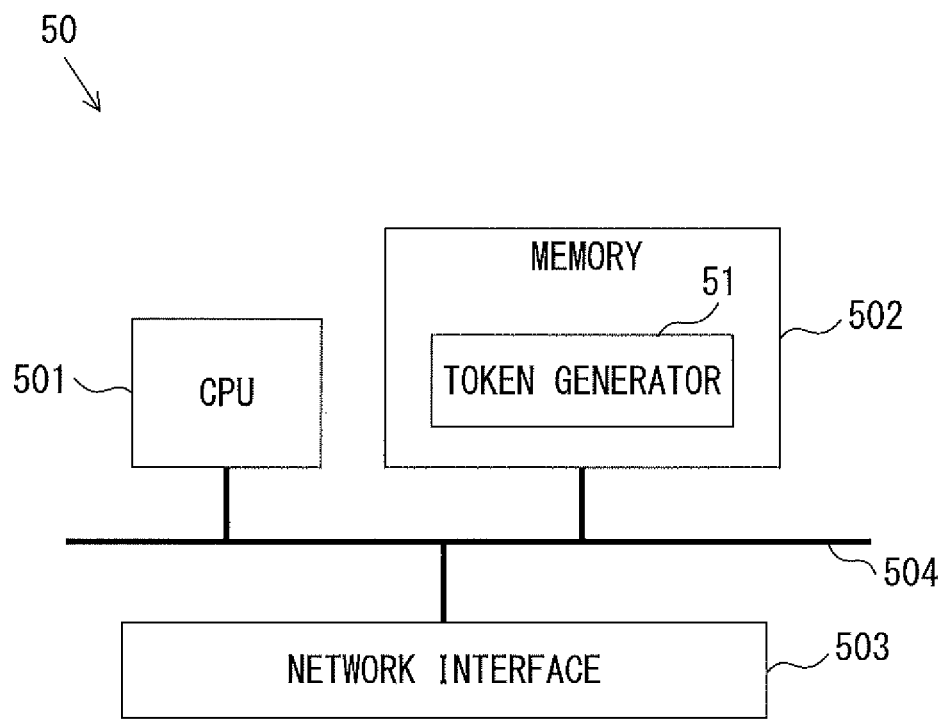
FIG. 18 illustrates an example of a configuration of an edge server manager.

FIG. 18 illustrates an example of a configuration of the edge server manager 50. The edge server manager 50 includes a CPU 501, a memory 502, and a network interface 503. The CPU 501, the memory 502, and the network interface 503 are connected to a bus 504.

The network interface 503 can communicate with the terminal manager 20 and the edge server 40 via a relay device such as a router. The memory 502 can store therein a program. In this example, a program that describes the process performed by the token generator 51 is stored in the memory 502. The CPU 501 executes a program stored in the memory 502. The function of the token generator 51 is provided by the CPU 501 executing a program stored in the memory 502. For example, the CPU 501 provides the function of the token generator 51 by executing the program that describes the process of the flowchart illustrated in FIG. 12.

Variation

In S7 illustrated in FIG. 4, the target flow section included in a token request may be the "input side of the application #2 (\*\*\*→App #2)". In this case, the range of a right of the token #2 generated in S8 is the "input side of the application #2 (\*\*\*→App #2)".

Likewise, in S12, the target flow section included in a token request may be the "input side of the application #4 (\*\*\*→ App #4)". In this case, the range of a right of the token #3 generated in S13 is the "input side of the application #4 (\*\*\*→App #4)".

Only a route in a range of a right of a given token may be described in route indication information. For example, only the route "App #4→App #3→App #2" on the input side of the application #2 is described in the route indication information of S11, and only the route "App #5→App #4" on the input side of the application #4 is described in the route indication information of S16.

In this case, as illustrated in FIG. 8B, the route indication processor 41 receives the following route indication information.
S6: App #2→App #1
S11: App #4→App #3→App #2
S16: App #5→App #4
Thus, the route indication processor 41 combines these routes so as to determine "App #5→App #4→App #3→App #2→App #1" to be a route of a traffic flow corresponding to the token #1.

Other Embodiments

Figure 19A:
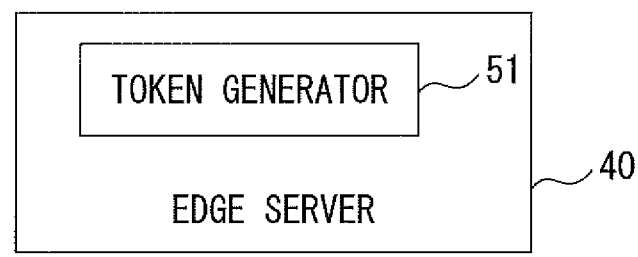
FIGS. 19A and 19B illustrate examples of other embodiments.

In the example illustrated in FIG. 2, the edge server manager 50 is provided independently of the edge server 40, and the edge server 40 is in corporation with the edge server manager 50 so as to operate as a route controller that controls a route of a traffic flow. However, the present invention is not limited to this configuration. For example, as illustrated in FIG. 19A, the function of the edge server manager 50 (that is, the token generator 51) may be implemented in the edge server 40. In this case, the edge server 40 including the token generator 51 operates as a route controller that controls a route of a traffic flow.

Figure 19B:
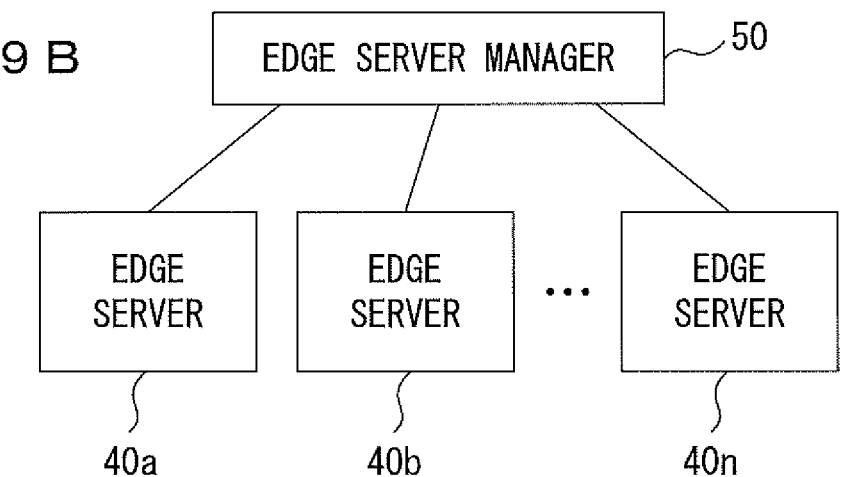

Further, in the example illustrated in FIG. 2, one edge server manager 50 is provided for one edge server 40, but the present invention is not limited to this configuration. For example, as illustrated in FIG. 19B, one edge server manager 50 may be provided for a plurality of edge servers 40. In this case, each edge server 40a-40n is in corporation with the edge server manager 50 so as to operate as a route controller that controls a route of a traffic flow.

In the example illustrated in FIGS. 3 and 4, the route of a traffic flow is indicated by a plurality of entities, but the present invention is not limited to this configuration. For example, one entity may indicate all of the routes in the edge server 40. In this case, a token that indicates a right to indicate routes in all of the sections of the edge server 40 is generated.

In the examples described above, taking into consideration the case in which it is difficult to identify each traffic flow from a packet header before the traffic flow is established, the terminal 10 adds a token to the first traffic flow when it is started. Then, the edge server 40 controls the route of the traffic flow based on the token. However, when it is possible to identify a specified traffic flow from a packet header before a traffic flow is established, the edge server 40 may control the route of the traffic flow without using a token.

For example, it is assumed that a traffic flow is identified by a destination IP address and/or a destination L4 port number of a business application to be accessed. In this case, when a request for a new token is made, the edge server 40 reports, to the token generator 51, the destination IP address and/or the destination L4 port number as information that identifies a traffic flow. Then, the destination IP address and/or the destination L4 port number are set in the token. In the example illustrated in FIG. 7, the destination IP address and/or the destination L4 port number are set as target flow information. Then, this token is given to the route controller 42 together with corresponding route information. The route controller 42 can control the route of the traffic flow according to the specified destination IP address and/or destination L4 port number. Thus, there is no need for the terminal 10 to add a token to a traffic flow, and there is no need for the terminal manager 20 to transmit a token to the terminal 10.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A route control device that controls a route of a traffic flow in a server device that accommodates a plurality of entities, the route control device comprising:

a generator configured to generate first control information that represents a right to indicate a route of the traffic flow in a first range in the server device, the first range including at least one of the plurality of entities;

a processor configured to receive first route indication information that indicates the route of the traffic flow and the first control information from a first entity in the plurality of entities and to decide whether the route of the traffic flow indicated by the first route indication information is set within the first range, the route of the traffic flow indicated by the first route indication information passing through at least one of the plurality of entities; and a route controller configured to determine the route of the traffic flow, wherein when the generator receives a request for a right to indicate the route of the traffic flow in a second range in the server device and the first control information from the first entity and the second range is included in the first range, the generator generates second control information that represents a right to indicate the route of the traffic flow in the second range, the second range including at least one of the plurality of entities, the generator provides the second control information to the first entity, and the second control information is transmitted from the first entity to a second entity in the plurality of entities, when the processor receives second route indication information that indicates the route of the traffic flow and the second control information from the second entity, the processor decides whether the route of the traffic flow indicated by the second route indication information is set within the second range, the route of the traffic flow indicated by the second route indication information passing through at least one of the plurality of entities that is different from the at least one of the plurality of entities indicated by the first route indication information, and when the route of the traffic flow indicated by the first route indication information is set within the first range and the route of the traffic flow indicated by the second route indication information is set within the second range, the route controller determines the route of the traffic flow such that the route of the traffic flow passes through the at least one of the plurality of entities indicated by the first route indication information and the at least one of the plurality of entities indicated by the second route indication information.

2. The route control device according to claim 1, wherein when the first control information and the second control information are added to the traffic flow, the route controller determines the route of the traffic flow based on the first route indication information and the second route indication information.

3. A network system comprising:

an edge server device configured to store therein a plurality of applications;

a terminal configured to access a target server device through the edge server device;

a terminal manager configured to manage the terminal; and an edge server manager configured to generate control information representing a right to indicate a route of a traffic flow between the terminal and the target server device, wherein the edge server device includes a processor that receives route indication information from at least one of the plurality of applications, and a route controller that determines the route of the traffic flow based on the route indication information received by the processor, the edge server manager generates first control information that represents a right to indicate the route of the traffic flow in a first range in the server device, the first range including at least one of the plurality of applications, the processor receives first route indication information that indicates the route of the traffic flow and the first control information from a first application in the plurality of applications, the processor decides whether the route of the traffic flow indicated by the first route indication information is set within in the first range, the edge server manager receives a request for a right to indicate the route of the traffic flow in a second range in the server device and the first control information from the first application, the edge server manager generates second control information that represents a right to indicate the route of the traffic flow in the second range when the second range is included in the first range, the second range including at least one of the plurality of applications, the edge server manager provides the second control information to the first application, the second control information is transmitted from the first application to a second application in the plurality of applications, the processor receives second route indication information that indicates the route of the traffic flow and the second control information from the second application, the processor decides whether the route of the traffic flow indicated by the second route indication information is set within the second range, the route of the traffic flow indicated by the second route indication information passing through at least one of the plurality of applications that is different from the at least one of the plurality of applications indicated by the first route indication information, and when the route of the traffic flow indicated by the first route indication information is set within the first range and the route of the traffic flow indicated by the second route indication information is set within the second range, the route controller determines the route of the traffic flow such that the route of the traffic flow passes through the at least one of the plurality of applications indicated by the first route indication information and the at least one of the plurality of applications indicated by the second route indication information.

4. A route control method for controlling a route of a traffic flow in a server device that accommodates a plurality of entities, the route control method comprising:

generating first control information that represents a right to indicate a route of the traffic flow in a first range in the server device, the specified range including at least one of the plurality of entities;

receiving first route indication information that indicates the route of the traffic flow and the first control information from a first entity in the plurality of entities;

deciding whether the route of the traffic flow indicated by the first route indication information is set within in the first range;

receiving a request for a right to indicate the route of the traffic flow in a second range in the server device and the first control information from the first entity;

generating second control information that represents a right to indicate the route of the traffic flow in the second range when the second range is included in the first range, the second range including at least one of the plurality of entities, providing the second control information to the first entity;

transmitting the second control information from the first entity to a second entity in the plurality of entities;

receiving second route indication information that indicates the route of the traffic flow and the second control information from the second entity;

deciding whether the route of the traffic flow indicated by the second route indication information is set within the second range, the route of the traffic flow indicated by the second route indication information passing through at least one of the plurality of entities that is different from the at least one of the plurality of entities indicated by the first route indication information; and determining the route of the traffic flow such that the route of the traffic flow passes through the at least one of the plurality of entities indicated by the first route indication information and the at least one of the plurality of entities indicated by the second route indication information when the route of the traffic flow indicated by the first route indication information is set within the first range and the route of the traffic flow indicated by the second route indication information is set within the second range.

* * * * *